US009227681B2

(12) United States Patent
Eldredge

(10) Patent No.: US 9,227,681 B2
(45) Date of Patent: *Jan. 5, 2016

(54) BICYCLE SEAT

(71) Applicant: Balanced Bicycle Seats LLC, Vineyard Haven, MA (US)

(72) Inventor: Robert M. Eldredge, Vineyard Haven, MA (US)

(73) Assignee: Balanced Bicycle Seats LLC, Vineyard Haven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,692

(22) Filed: Mar. 17, 2015

(65) Prior Publication Data

US 2015/0191207 A1 Jul. 9, 2015

Related U.S. Application Data

(63) Continuation of application No. 13/675,864, filed on Nov. 13, 2012, now Pat. No. 8,998,314.

(51) Int. Cl.
*B62J 1/00* (2006.01)
*B62J 1/04* (2006.01)

(52) U.S. Cl.
CPC *B62J 1/007* (2013.01); *B62J 1/005* (2013.01); *B62J 1/04* (2013.01)

(58) Field of Classification Search
CPC .............. B62J 1/007; B62J 1/04; B62J 1/005
See application file for complete search history.

(56) References Cited

U.S. PATENT DOCUMENTS 591,330 A    10/1897  Downes
605,151 A *   6/1898  Twist ............................. 297/202
(Continued)

FOREIGN PATENT DOCUMENTS

DE       827008 C  *  1/1952  ............... B62J 1/002
DE    20004741 U1  *  5/2000  ............... B62J 1/005
(Continued)

OTHER PUBLICATIONS

Brown, Sheldon "Comfort", "A Comfortable Bicycle Saddle", retrieved from the Internet on Jun. 15, 2012, www.sheldonbrown. com/saddles.html, 9 pages.
(Continued)

*Primary Examiner* — Jeanette E Chapman
(74) *Attorney, Agent, or Firm* — Fish & Richardson P.C.

(57) ABSTRACT

Among other things, a structure supports the ischial tubularities of a user of a device to which the structure is attached, while gravity is applying a downward force on the ischial tubularities and the user's legs are engaged in motion during which forces are being applied that tend to cause the user's respective ischial tubularities to move relative to a frame of the device. The structure includes two buttock supports having surfaces against which the bottom surfaces of the user's respective buttocks bear during the motion. A mechanism connects the two buttock supports to the frame of the device to permit simultaneously (1) free motion of the two buttock supports (a) up and down relative to a frame of the device and (b) back and forth relative to the frame of the device and (2) free variation of the angular orientations of the bottom surfaces of the user's buttocks back and forth, relative to a hypothetical horizontal plane that is fixed relative to the frame of the device.

23 Claims, 17 Drawing Sheets

(56) References Cited

U.S. PATENT DOCUMENTS

| | | | |
|---|---|---|---|
| 619,768 A | 2/1899 | Lewis | |
| 621,139 A | 3/1899 | Reuter | |
| 621,140 A * | 3/1899 | Reuter | A47C 7/024 |
| | | | 297/312 |
| 694,875 A * | 3/1902 | Meighan | B62J 1/005 |
| | | | 297/201 |
| 2,664,941 A | 1/1954 | Gillespie | |
| 4,089,559 A | 5/1978 | Prange et al. | |
| 4,387,925 A | 6/1983 | Barker et al. | |
| 4,541,668 A * | 9/1985 | Rouw | 297/201 |
| 5,123,698 A * | 6/1992 | Hodges | 297/201 |
| 5,286,082 A | 2/1994 | Hanson | |
| 5,387,025 A | 2/1995 | Denisar | |
| 5,725,274 A | 3/1998 | Bergmeister | |
| 5,823,618 A | 10/1998 | Fox et al. | |
| 5,911,474 A * | 6/1999 | Lee | 297/201 |
| 5,988,740 A | 11/1999 | Caraballo | |
| 6,056,356 A * | 5/2000 | Unger, Jr. | 297/201 |
| 6,139,095 A | 10/2000 | Robertshaw | |
| 6,139,098 A | 10/2000 | Carrillo | |
| 6,142,562 A | 11/2000 | Varan | |
| 6,183,043 B1 * | 2/2001 | Nelson | 297/201 |
| D454,258 S | 3/2002 | Yates | |
| 6,357,825 B1 * | 3/2002 | Bavaresco | 297/201 |
| 6,402,235 B1 | 6/2002 | Letendre | |
| 6,402,236 B1 | 6/2002 | Yates | |
| 6,761,400 B2 | 7/2004 | Hobson | |
| 6,783,176 B2 | 8/2004 | Ladson, III | |
| 6,786,542 B1 * | 9/2004 | Nuzzarello | 297/201 |
| 6,957,855 B1 | 10/2005 | Weary | |
| 7,494,181 B2 | 2/2009 | Tucker | |
| 2001/0040402 A1 | 11/2001 | Odderson | |
| 2002/0093230 A1 | 7/2002 | Bigolin | |
| 2003/0038515 A1 | 2/2003 | Martin et al. | |
| 2011/0260511 A1 | 10/2011 | Sirjord | |
| 2011/0298253 A1 | 12/2011 | Toll | |
| 2014/0333102 A1 | 11/2014 | Eldredge | |
| 2014/0375092 A1 * | 12/2014 | Curless | B62J 1/005 |
| | | | 297/201 |

FOREIGN PATENT DOCUMENTS

| | | | | |
|---|---|---|---|---|
| DE | 102013005383 A1 * | 10/2014 | | B62J 1/005 |
| GB | 229525 A * | 2/1925 | | B62J 1/005 |
| KR | 20030039431 A * | 5/2003 | | B62J 1/005 |
| WO | WO 2014/078185 | 5/2014 | | |

OTHER PUBLICATIONS eBay, Inc., "Electronics, Cars, Collectibles, Coupons and More Online Shopping", retrieved from Internet on Jun. 15, 2012, www.compare.ebay.com/like/140711007498?var=lv<yp-Al-lFixPriceItemTypes&var-sbar, 2 pages.
Advance Seating Design, "Advance Seating designs—split seat and movement lock", updated May 24, 2008, retrieved from the Internet on Jun. 15, 2012, www.asd.co.uk/speacial_needs/splitseat/splitseat.htm, 1 page.
CityStop, LLC, bike product information, retrieved from the Internet on Jun. 15, 2012, www.citystop.com/bikes/Bike_Seats_NEW.htm, 6 pages.
Lecky, "Contour Advance Seat", retrieved from the Internet on Jun. 15, 2012, www.leckey.com/products/contoured-advance-seat/, 6 pages.
Glencar, "Healthfieldindependent adjustable split seat", retrieved from the Internet on Jun. 15, 2012, www.glencar.ie/gc_products/healthfield-independent-adjustable-split-seat/, 1 page.
eBay, Inc., cycling saddle information, retrieved from the Iternet on Jun. 15, 2012, www.ebay.com/itm/Selle-SMP-Extra-Cycling Saddle-Black-Split-Bike-Seat-/360298741154, 4 pages.
Chagalo, "A Comfortable Bicycle Seat", retrieved from the Internet on Jun. 15, 2012, www.chagalo.org/BIke/BicycleSeat.php, 5 pages.
Songywonder, "Bicycle Seats", retrieved from the Internet on Jun. 15, 2012, www.spongywonder.com/, 8 pages.
Core77, Inc., "Lay off the horn", retrieved from the Internet on Jun. 15, 2012, www.core77.com/blog/object_culture/lay_off_the_horn_9697.asp, 3 pages.
Inewidea, "Lift Bike Arm Carrier", retrieved from the Internet on Jun. 15, 2012, www.inewidea.com/tag/bike, 30 pages.
International Search Report and Written Opinion issued on Mar. 28, 2014 in PCT application No. PCT/US2013/069125 (13 pages).
U.S. Appl. No. 13/675,864.
U.S. Appl. No. 13/891,313.

* cited by examiner

BICYCLE SEAT

This application is a continuation and claims priority under 35 U.S.C. §120 to U.S. patent application Ser. No. 13/675,864, filed Nov. 13, 2012, the entire content of which is incorporated here by reference.

BACKGROUND

This description relates to a bicycle seat.

Hominids, particularly the fatuously self-designated *Homo Sapiens*, may achieve locomotion over dry land in a variety of ways, of which the most typical for an adult, uninjured, non-inebriated individual are running and walking. As humans have modified parts of the earth's surface into relatively smooth pathways for easier walking and running, and have invented axles and wheels, the invention of the bicycle has also been possible as a way of increasing speed by mechanical advantage.

Viewed ergonomically, pushing pedals in a circle is geometrically simple, but requires complex articulation to be accomplished through the non-simple anatomy of a creature evolved for running over non-simple surfaces. For as long as there have been bicycles it has been evident to everyone that bicycle saddles (we sometimes use the term seats interchangeably with saddles) are uncomfortable. The rider's weight and discomfort are on and in the rider's crotch. Attempts have been made to relieve discomfort by hollowing the saddle at the center, which necessarily makes the saddle wider and thus increases friction between the rider's inner thighs and buttocks and the saddle. Any increase in friction in any human powered machine is not likely to be a good idea. There seems to be an idea that a cyclist needs to hold on to a bicycle by the seat of his pants, which is left over from the long association between humans and horses. This is largely nonsense. Bicycles have handlebars.

SUMMARY

In general, in an aspect, a structure supports the ischial tubularities of a user of a device to which the structure is attached, while gravity is applying a downward force on the ischial tubularities and the user's legs are engaged in motion during which forces are being applied that tend to cause the user's respective ischial tubularities to move relative to a frame of the device. The structure includes two buttock supports having surfaces against which the bottom surfaces of the user's respective buttocks bear during the motion. A mechanism connects the two buttock supports to the frame of the device to permit simultaneously (1) free motion of the two buttock supports (a) up and down relative to a frame of the device and (b) back and forth relative to the frame of the device and (2) free variation of the angular orientations of the bottom surfaces of the user's buttocks back and forth, relative to a hypothetical horizontal plane that is fixed relative to the frame of the device.

Implementations may include one or more of the following features. The structure is a seat attached to the device. The device includes a vehicle. The device includes a seat. The ischial tubularities move cyclically.

In general, in an aspect, a structure supports the ischial tubularities of a user of a cycling device while gravity is applying a downward force on the ischial tubularities and the user's legs are moving in a repetitive pedaling cycle during which forces are being applied that tend (1) to cause the user's respective ischial tubularities (a) to move up and down relative to a frame of the device and in opposite phases relative to one another and (b) to move forward and aft relative to the frame of the cycling device and in opposite phases relative to one another and (2) to cause the angular orientations of the bottom surfaces of the user's buttocks to vary back and forth, relative to a hypothetical horizontal plane that is fixed relative to the frame of the device, and in opposite rotational phases relative to one another. The structure includes two buttock supports having surfaces against which the bottom surfaces of the user's respective buttocks bear during the pedaling cycle. A mechanism connects the two buttock supports to the frame of the device to permit simultaneously (1) free motion of the two buttock supports (a) up and down relative to a frame of the device and in opposite phases relative to one another and (b) back and forth relative to the frame of the device and in opposite phases relative to one another and (2) free variation of the angular orientations of the bottom surfaces of the user's buttocks back and forth, relative to a hypothetical horizontal plane that is fixed relative to the frame of the device, and in opposite rotational directions relative to one another.

Implementations may include one or more of the following features. The mechanism enables the two buttock supports to move independently of one another. The mechanism includes an adjustment to alter a distance between the two buttock supports. The structure includes a connector to attach the structure to an existing seat mount of the device. The structure is configured so that the two buttock supports will support the user's buttocks at a distance from handlebars of the device that is similar to a distance from the handlebars at which the buttocks would be supported by an existing seat of the device. The surfaces of the buttock supports are concave. The surfaces of the buttock supports are no larger than necessary to provide comfortable support to the surfaces of the user's buttocks. A transverse base is coupled to the buttock supports so that each of the buttock supports can move relative to the transverse base and the buttock supports can move relative to one another. The mechanism includes two joints coupling the buttock supports to the frame, each of the two joints permitting the corresponding buttocks support to move freely fore and aft end up and down relative to the frame and to permit the angular orientations of the buttock supports to vary within ranges that are at least slightly more than the ranges of motion of the buttocks of the user during the pedaling cycle. Each of the couplings constrains the motion of the corresponding buttock support in ranges that are greater than at least slightly more than the ranges of motion of the buttocks of the user during the pedaling cycle. The two joints are coupled to a transverse support. The transverse support is coupled to the frame by a joint that allows the transverse support to rotate horizontally and rock from side to side. The joint includes a shaft that is canted toward the rear of the cycling device in side elevation to the same degree as the cycling device's seat post. The cycling device includes a bicycle.

These and other aspects, features, and implementations, and combinations of them, can be expressed as systems, components, assemblies, apparatus, methods, and means and steps for performing functions, and in other ways.

Other aspects, features, and implementations will become apparent from the following description and from the claims.

DESCRIPTION

Figure 24:
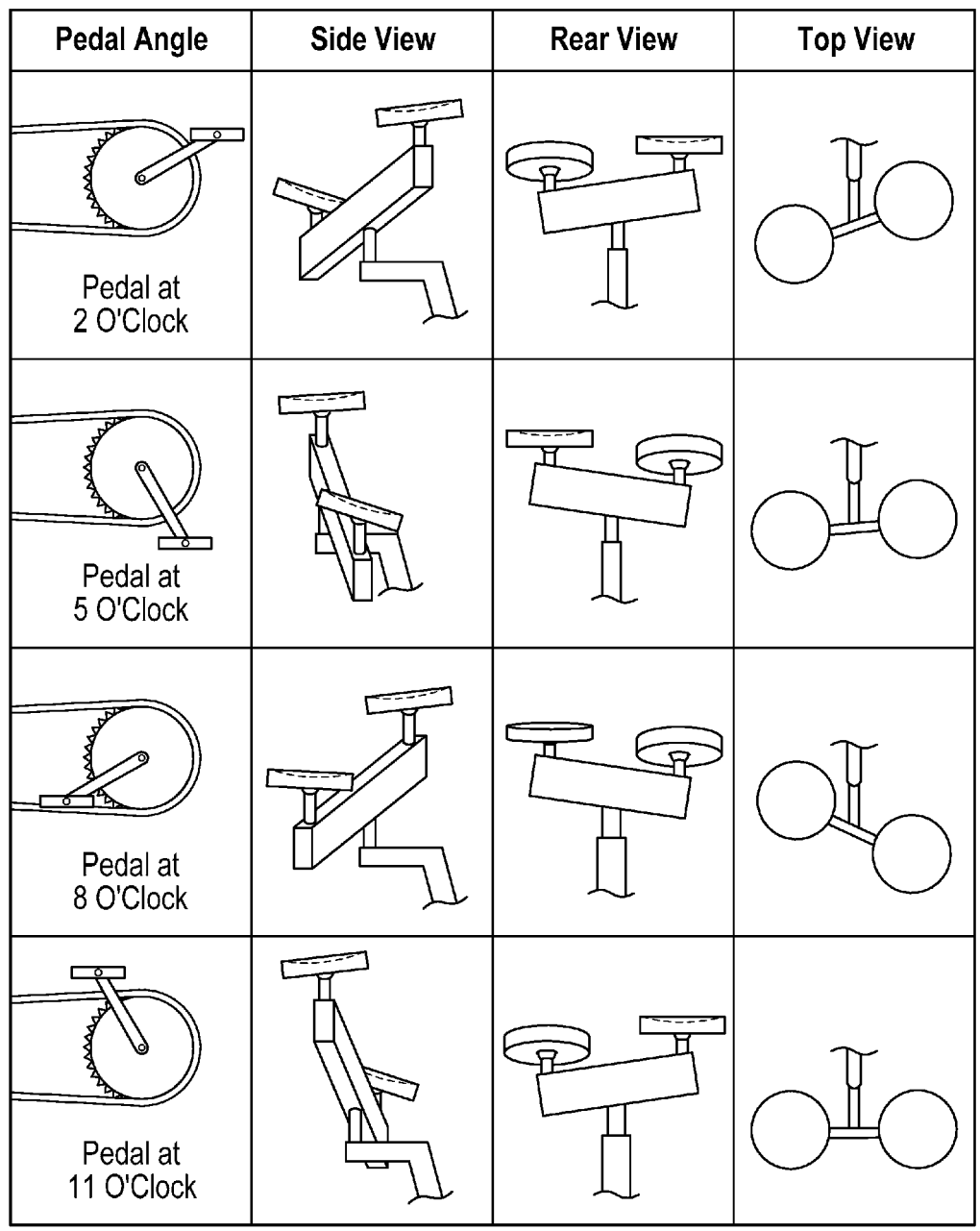

FIG. 24 is a matrix of views of the bicycle seat at four different pedal positions as a means of illustrating how the seat articulates its way through a pedaling cycle. The four positions are identified (from top to bottom) as the angle of the pedal crank arms as compared to the identical angles of the hour hand of a clock. Starting from the top and proceeding toward the bottom in the first column, the angles taken as examples of pedal positions are as at 2 o'clock, 5 o'clock, 8 o'clock, and 11 o'clock. The seat is illustrated from left to right on the page as a right side view, a rear view, and a top view. The matrix of views is formed as each pedal angle is illustrated in each view. Throughout the pedaling cycle, in every case, a line drawn through the sockets of the pelvis which hold the upper ends of the femurs will remain parallel to the transverse beam of the seat. Thus the seat allows the pelvis to move freely without constraint as it would in running.

Figure 25:
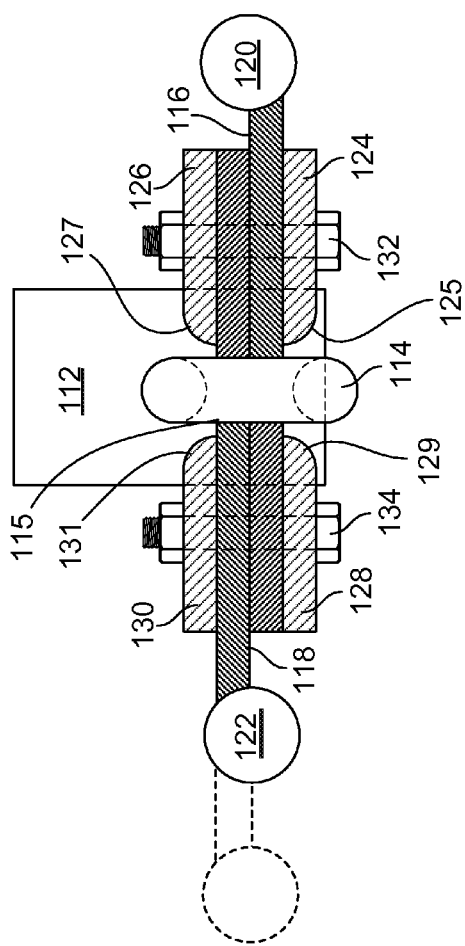

FIG. 25 is a horizontal section through transversely perforated block and assembled transverse beam shown at maximum and minimum extensions.

Figure 26:
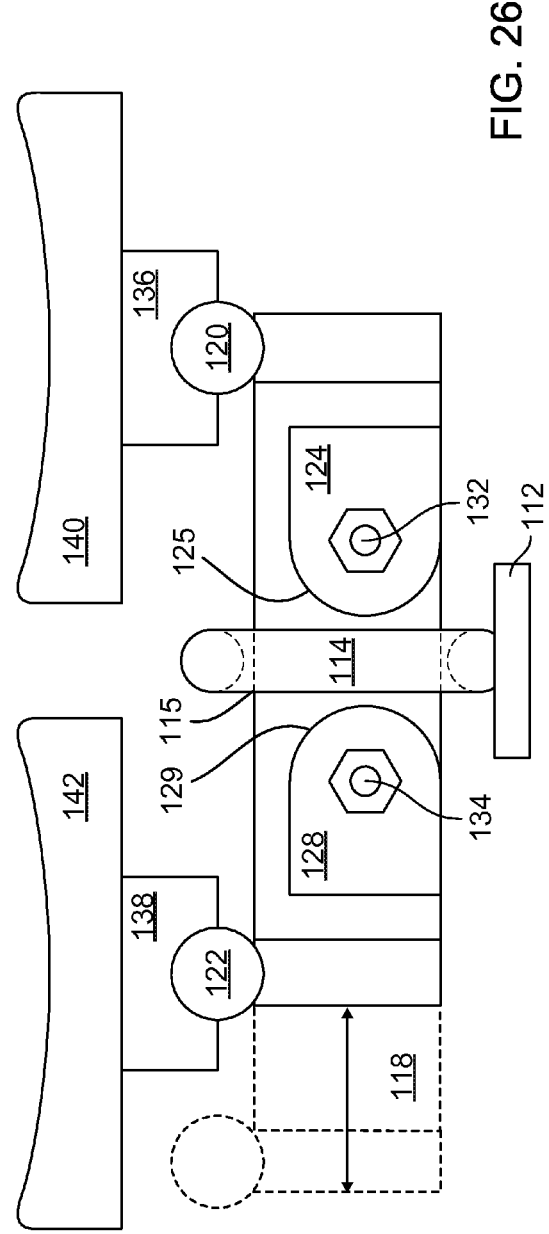

FIG. 26 is a front elevation of the bicycle seat with the transverse beam shown at maximum and minimum extensions.

Figure 27:
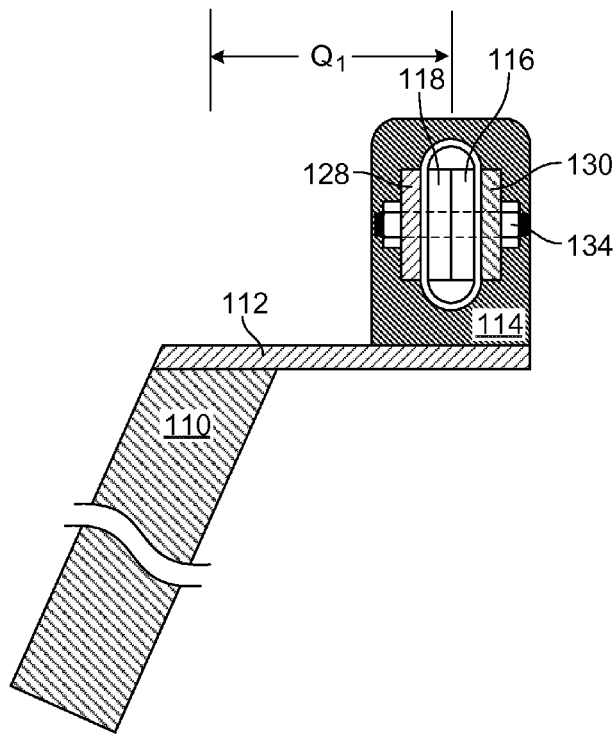

FIG. 27 is a side elevation vertical section through the transversely perforated block and the assembled transverse beam.

Figure 28:
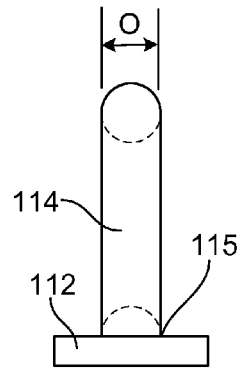

FIG. 28 is a front elevation of a portion of the seat support.

Figure 29:
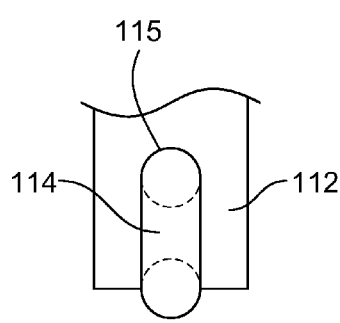

FIG. 29 is a plan of a portion of the seat support.

Figure 30:
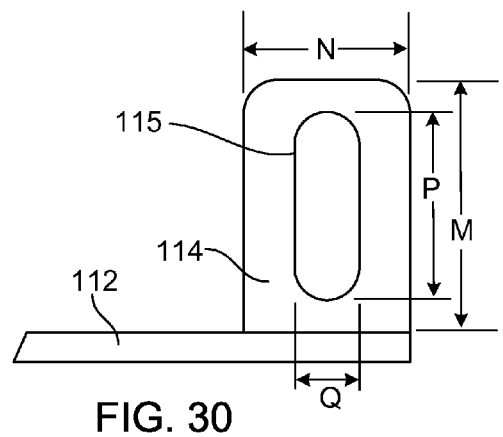

FIG. 30 is a side elevation of a portion of the seat support.

Figure 31:
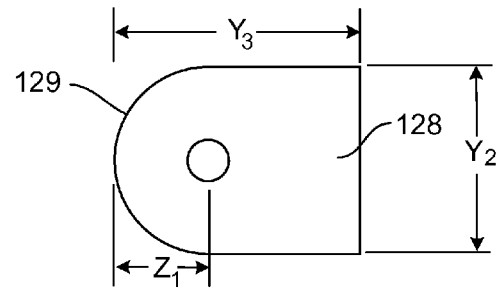

FIG. 31 is a front elevation of a portion of the seat support.

Figure 32:
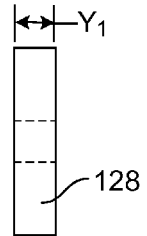

FIG. 32 is a side elevation of a portion of the seat support.

Figure 33:
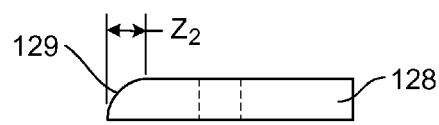

FIG. 33 is a plan of a portion of the seat support.

Figure 34:
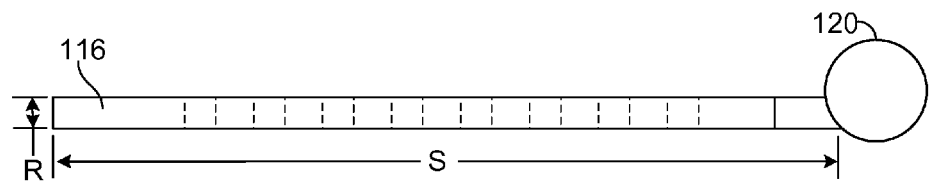

FIG. 34 is a plan of a portion of the seat support.

Figure 35:
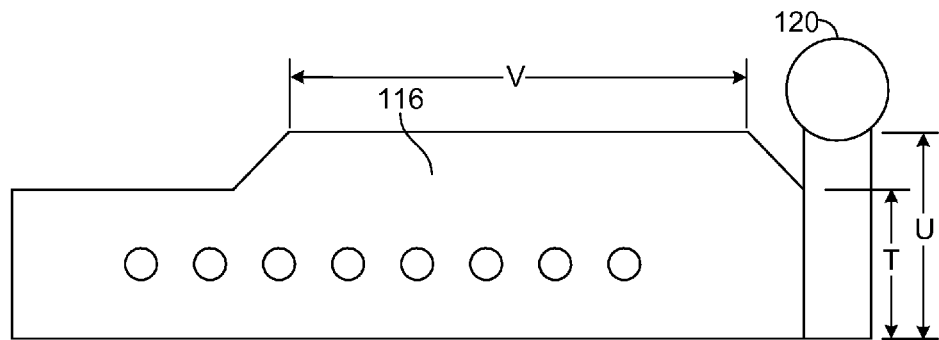

FIG. 35 is a front elevation of a portion of the seat support.

Figure 36:
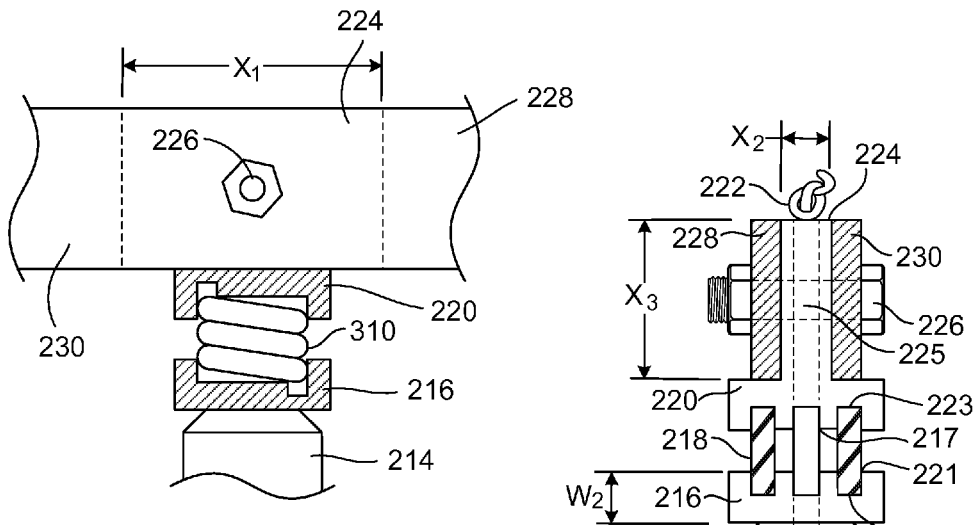

FIG. 36 is a front elevation vertical section through the central bearing showing Parts 214, 216, 310, 220, 224, 226.

Figure 37:
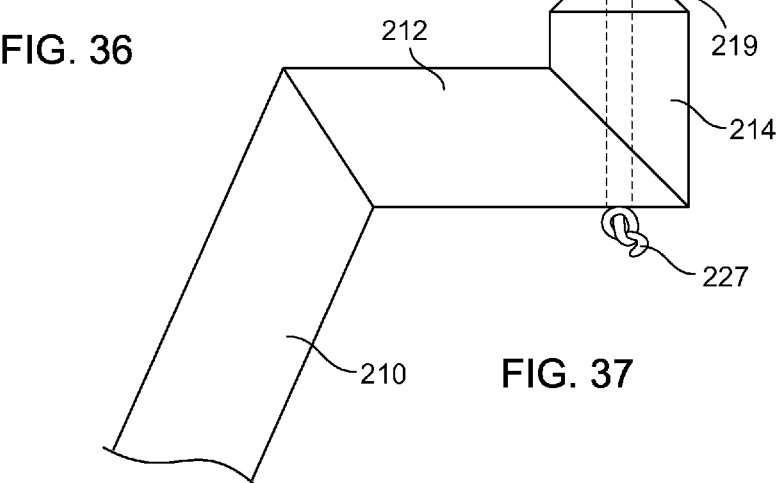

FIG. 37 is a side elevation vertical section through the central bearing and the assembled transverse beam.

Figure 38:
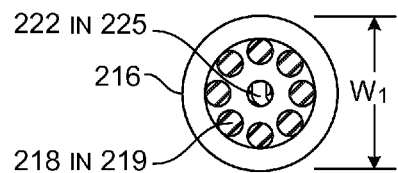

FIG. 38 is a horizontal section through the lower part of the central bearing.

Figure 39:
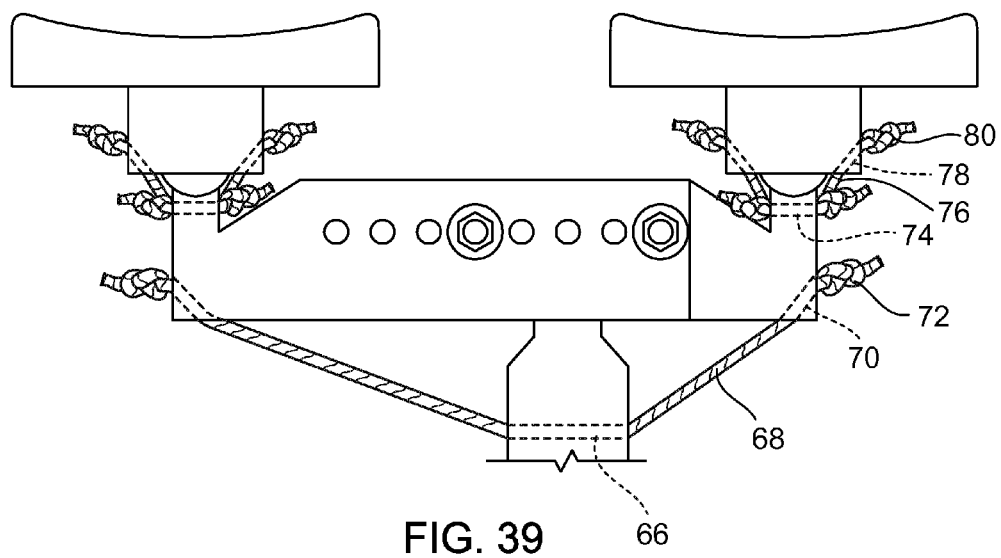

FIG. 39 is a composite front elevation of a bicycle seat, left side, showing a transverse beam adjusted to the maximum length, and right side showing the transverse beam adjusted to the minimum length.

Figure 40:
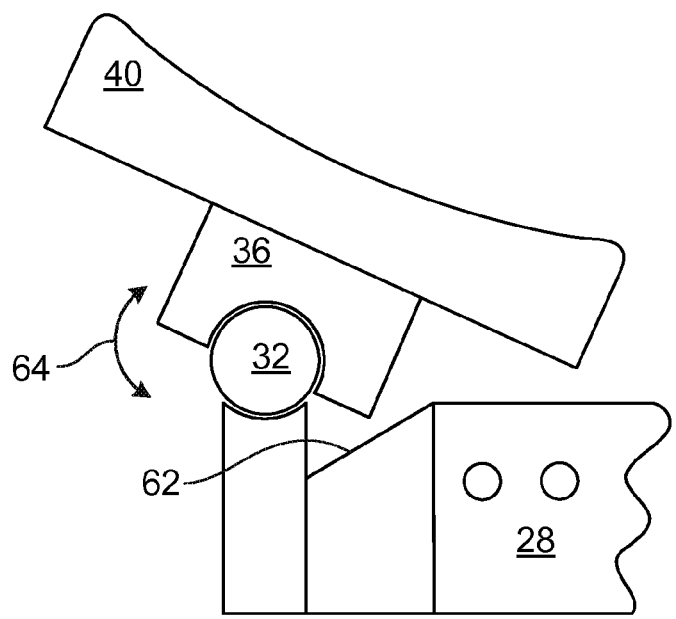

FIG. 40 is a front elevation of the right end of the bicycle seat, showing the seat structure tilted toward the transverse beam part 28, and showing how the seat mount 36 does not contact the transverse beam in this tilted position because of cut out 62.

Figure 41:
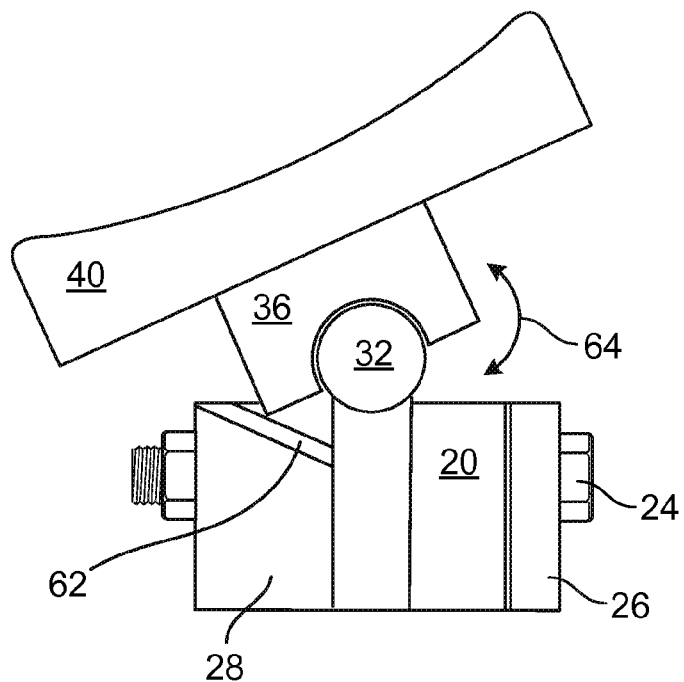

FIG. 41 is a side elevation of the bicycle seat showing the seat structure in a forward tilted position and showing how the seat mount 36 does not contact the transverse beam part 28 because of cut out 62.

LIST OF PARTS

10, seat post shaft
11, shaft upper end
12, cantilevered beam
14, vertical post
16, central joint ball
17, plan view centerline of rectangular split block 19
18, central socket, forward half
19, rectangular split block
20, central socket, aft half
21, channel
22, bolt, nut, washer, left side
23, 25, split block bolt holes
24, bolt, nut, washer, right side
26, transverse beam, left side
28, transverse beam, right side
29, beam holes
30, transverse beam end post and ball, left side
32, transverse beam end post and ball, right side
34, seat mount socket, left side
36, seat mount socket, right side
38, seat part, left side
40, seat part, right side
42, seat upholstery, left side
44, seat upholstery, right side
45, 47, split block edges
49, 51, vertical post outer surfaces
60, 62, transverse beam cut outs
63, 64, tilting of the seat parts
66, hole in vertical post 14
68, bungee cord
70, hole in transverse beam end
72, knot in bungee cord 68
74, hole in transverse beam end post
76, bungee cord
78, hole in seat mount socket
80, knot in bungee cord 76
112, cantilevered beam or spring
114, transversely perforated block
115, opening in block 114
116, transverse beam, left side
118, transverse beam, right side
120, transverse beam end post and ball, left side 122, transverse beam end post and ball, right side
124, cheek piece, left forward
125, rounded end of 124 cheek piece
126, cheek piece, left aft
127, rounded end of 126 cheek piece
128, cheek piece, right forward
129, rounded end of 128 cheek piece
130, cheek piece, right aft
131, rounded end of 130 cheek piece
132, bolt, nut, washer, left side
134, bolt, nut, washer, right side
136, seat mount socket, left side
138, seat mount socket, right side
140, seat, left side
142, seat, right side
210, seat post shaft
212, cantilevered beam or spring
214, vertical post
216, short cylinder with recessed top and central hole
217, central hole in short cylinder 216
218, array of rubber cylinders
219, shallow holes arranged in circle in short cylinder 216
220, short cylinder with recessed bottom and central hole
221, central hole in short cylinder 220
222, Dacron cord
223, shallow holes arranged in circle in short cylinder 220
224, mounting block for transverse beam
225, vertical central hole in mounting block 224
226, bolt, nut, washer
227, knots at ends of Dacron cord 222
228, transverse beam, forward half
230, transverse beam, aft half
310, coiled spring To be good ergonomically, an interface between human and bicycle should allow a close (e.g., the closest possible) approximation of the way the human skeleton is articulated in the act of running naturally. The bicycle seat, as a principle part of the human to bicycle interface, should support part of the rider's weight, while not interfering unnecessarily (e.g., by interfering to the least possible degree) with the natural articulation characteristic of the running body, and with the flow of blood to and from the rider's legs and feet, and should create little (e.g., the least possible) friction anywhere in the rider plus bicycle system.

Here we describe a divided and fully articulated bicycle seat that is ergonomically designed to support the weight of the rider on his two buttocks and not constrain the motion of the rider's body in any direction except the straight down direction (in resisting gravity), and then only proportionally to the way the weight of the rider is distributed between the buttocks at a given instant during each pedaling cycle. There are two separated seat parts, each supporting one of the rider's buttocks (we sometimes refer to the seat parts as buttock supports). Each of the seat parts is designed to move and reorient itself freely with the position and orientation of the buttock seated on it, during the pedaling cycle, and not to move at all relative to the buttock, creating no friction between the buttock and the seat part.

In some implementations, as the rider pedals, a transverse beam on which the two seat parts are mounted gyrates through three-dimensional space, following and not resisting at any point in the pedaling cycle the natural motion of buttocks attached to legs which are driving pedals. The ball and socket joints through which the seat parts are mounted at two places (e.g., at the ends) of the transverse beam gyrate in sympathy with the beam while a surface of each of the seat parts continually reorients itself to maintain a constant orientation relative to the corresponding buttock. The buttock supporting seat parts of this structure, whose mounts allow them to tilt in any direction and rotate independently from the transverse beam on whose ends they are mounted, maintain constant contact with the lower surfaces of the buttocks and tilt and rotate relative to the transverse beam exactly in sympathy with the buttocks throughout the pedaling cycle, and thus do not rub against them. Therefore no (or as little as possible) friction is created between the rider's skin and this structure. This arrangement of universal (e.g., ball and socket) joints functionally mirrors the arrangement in the human body, in which the pelvic bone is free to gyrate relative to the bottom of the spine, and the femurs are free to gyrate relative to the ends of the pelvic bone.

As the free flowing action of the seat does not constrain the body in the act of pedaling (in other words, the femurs and pelvic bone are completely free to move and gyrate as they normally do while running), it is also true that it provides the rider's crotch with no way to stabilize or constrain the bicycle. This however is not needed because the rider can support herself and control the bicycle with the handlebars and by shifting her weight on her hands and feet on the handlebars and pedals. While it is true that riders have traditionally used saddles to create stability and help steer, the loss of this is as nothing compared to the benefit of the freedom of motion and the loss of friction between the rider and the bicycle of the saddle being described here.

Figure 1:
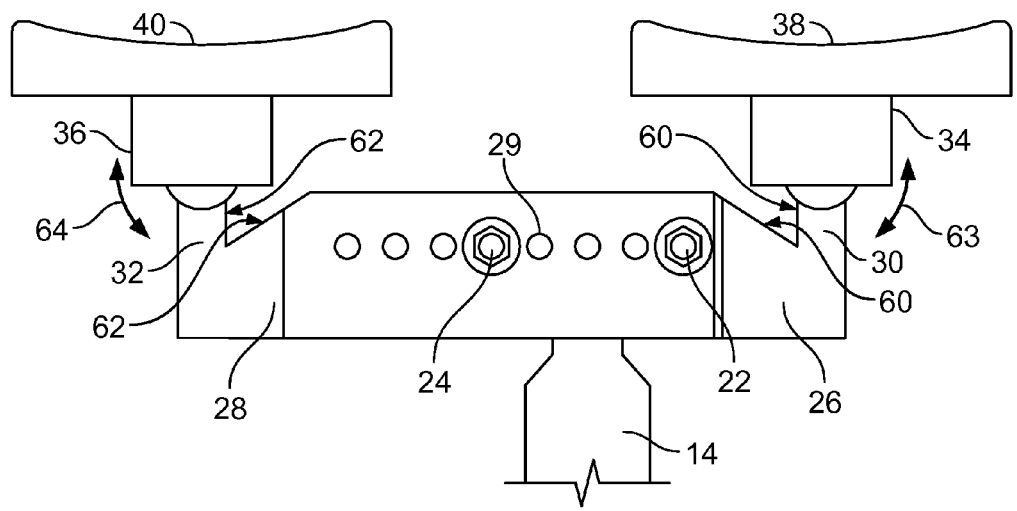
FIG. 1 is a composite front elevation of a bicycle seat, left side showing the transverse beam adjusted to the maximum length, and right side showing the transverse beam adjusted to the minimum length.
Figure 2:
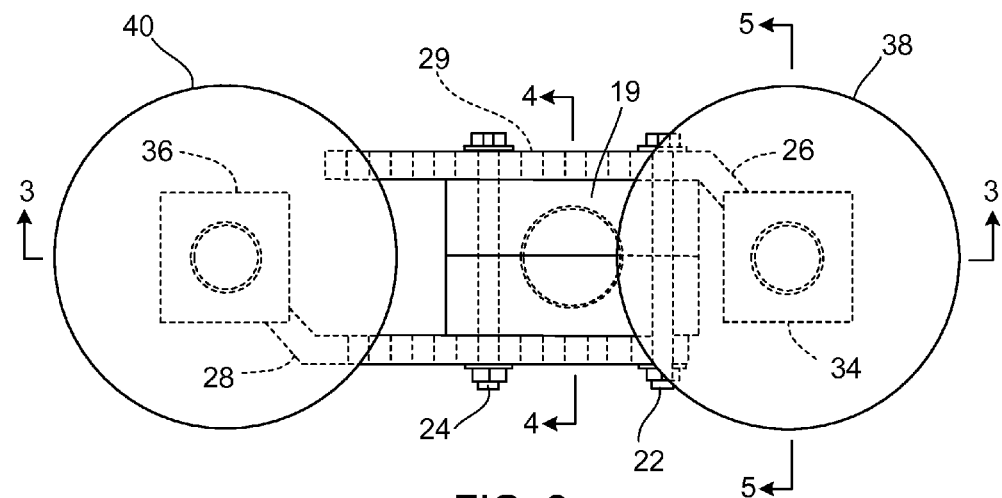
FIG. 2 is a horizontal section through the transverse beam and seats.
Figure 3:
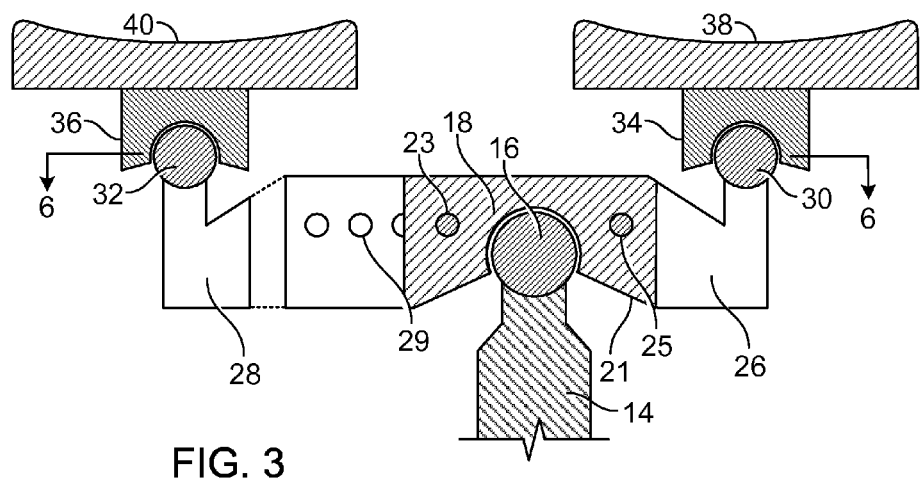
FIG. 3 is a vertical section through the transverse beam and the central ball and socket joint and the seat mount bearings.

Some implementations are illustrated by example in FIG. 1 (a front elevation of the assembled parts of the seat), and FIG. 2 (a horizontal section through the plan view of the transverse beam and seats). As shown in FIG. 39, thin bungee cords of no great strength may be added to the vertical post 14 and to the transverse beam end posts, left side and right side 30 and 32, to gently return the transverse beam and the seat sections to square and level default positions, when not being pushed by the rider, to facilitate the act of mounting the bicycle. A thin bungee cord 68 passes through holes 66 and 70 in vertical post 14 and transverse beam end posts 30 and 32, and is fixed in place under light tension by knots 72, typical. Two other bungee cords 76 pass through holes 74 and 78 in transverse beam end posts 30 and 32 and seat mount sockets 34 and 36 and are fixed in place under light tension by knots 80, typical. The bungee cords may be of thin diameter, ⅛", for example, and under the minimum tension needed to pull the transverse beam and seat mounts to square and level positions. This tension need only be very light as the elements of this structure weigh little and are well balanced on their mounts. A variety of other devices and combinations of them could be used to provide such tension, including curved flat leaf compression springs and coil springs.

Figure 8:
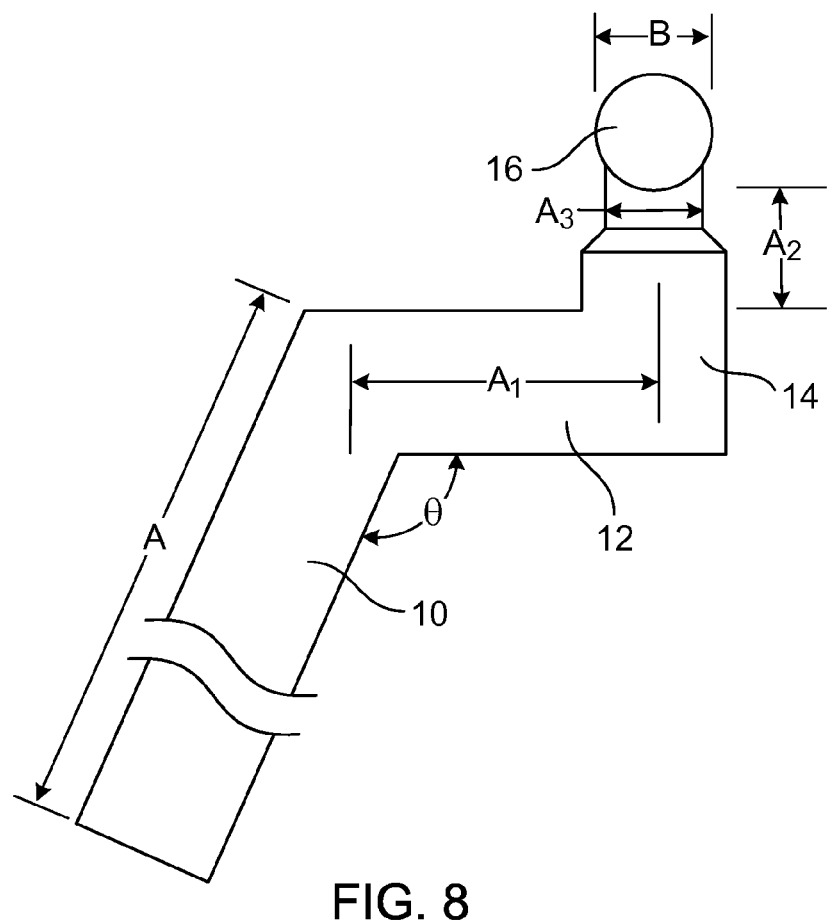
FIG. 8 is a side elevation of a portion of the seat support.

As also shown in FIG. 8, in some instances, a seat post shaft 10 is a 14" long (A) cylinder of a diameter which fits inside the seat post of the bicycle, and which can be used to adjust the seat height by sliding it into and out of the seat post to the desired height and tightening the bicycle's own seat post clamp. The seat post shaft 10 may be made of aluminum or steel or glass reinforced plastic (GRP) or plastic and carbon fiber composite, for example. A short (for example, about 3" measured from the centerline of the shaft to the centerline of the post ($A_1$)) cantilevered beam 12 of the same material, for example, is welded to, or integrally cast with the seat post shaft 10 at its top end, at an angle of about 115 degrees, such that, with the seat post shaft 10 inserted in the bicycle seat post, the cantilevered beam 12 will be level and extend, cantilevered aft along the centerline of the bicycle, about 3", so that the rider sitting on the seat will have the same relative position (fore and aft) to the pedals and handlebars he would have if sitting on a traditional saddle. At its free end the cantilevered beam 12 turns vertical, for example by the same means it previously turned horizontal, to form a short vertical post 14, for example, 1" from the top of the beam to the bottom of the spherical finial ($A_2$). At its top end, the vertical post 14 is reduced in diameter to ¾" ($A_3$) and ends in a 1" diameter (B) spherical finial 16. If the vertical post 14 is made of aluminum or steel tubing, the central joint ball 16 may be made of cast aluminum, or GRP, or composite, or nylon, for example, and made as a separate piece and inserted in the end of the vertical post 14. If the seat post shaft 10, the cantilevered beam 12, and the vertical post 14 are made of GRP or composite, the central joint ball 16 may be an integral part of the whole casting. The central joint ball 16 acts as the ball of a ball and socket joint which connects the seat post shaft 10, the cantilevered beam 12, the vertical post 14, and the central joint ball 16, shown assembled in figures 1 and 8, to the assembled transverse beam.

Figure 4:
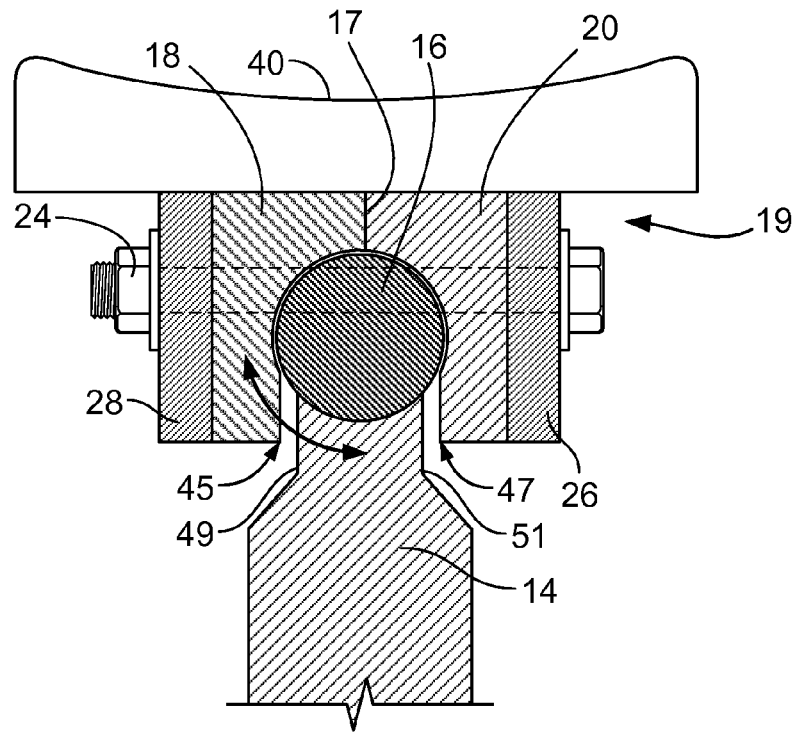
FIG. 4 is a vertical section 90 degrees across the centerline of the transverse beam through the central ball and socket joint.
Figure 11:
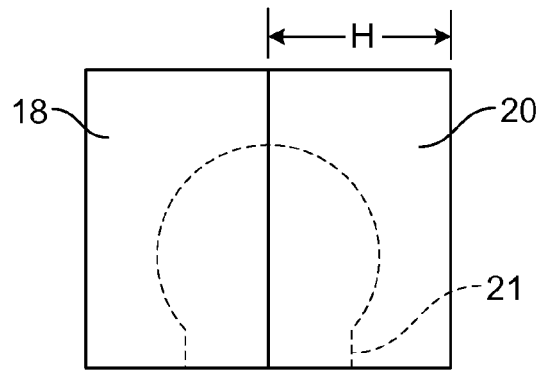
FIG. 11 is a side elevation of a portion of the seat support.
Figure 12:
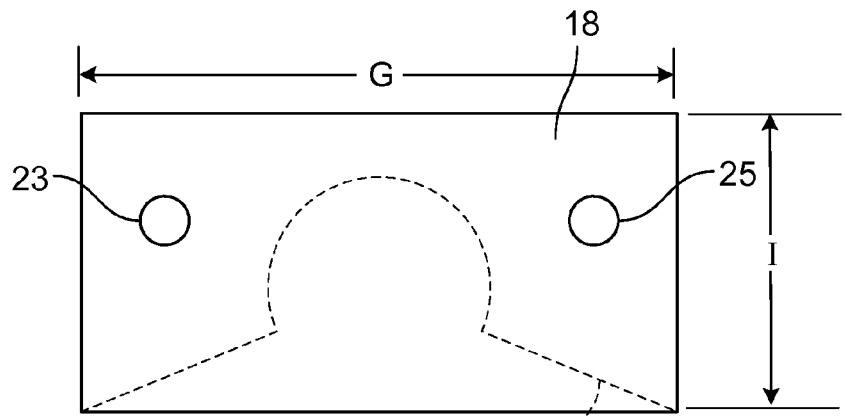
FIG. 12 is a front elevation of a portion of the seat support.
Figure 13:
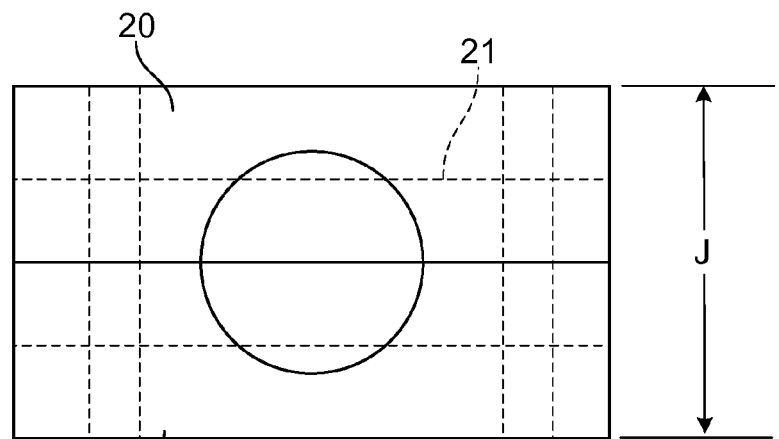
FIG. 13 is a plan view of a portion of the seat support.

As shown in FIG. 4, for example, a central socket, forward half 18 and a central socket, aft half 20 are two identical halves of a rectangular nylon block which is split in half along the lengthwise vertical centerline 17, as also shown in FIGS. 11, 12, and 13. The identical parts 18 and 20 each measure, for example, 3" long (G), ⅞" wide (H), and 1½" high (I), so that, when assembled, split block 19 measures 3" long, 1¾" wide (J), and 1½" high. The split block halves 18 and 20 are hollowed to form a spherical socket for which the central joint ball 16 forms the ball. A channel 21 (see FIGS. 11, 12, and 13, for example) is cut in the bottom of the assembled block, lengthwise, of a width to pass the ¾" diameter stem of post 14, and cut increasingly deeply going from the ends toward the center. This channel will allow the assembled transverse beam to rock from side to side relative to the bicycle, but not to tip forward or aft. This ball and socket joint also allows the assembled transverse beam to rotate on a vertical axis while at any angle of side to side rocking. The two halves of the rectangular split block 18 and 20 have two bolt holes 23, 25, ¼" in diameter, passing through the assembled block horizontally through the vertical longitudinal centerline split. The two ¼"×3" hex head bolts with nuts and washers 22 and 24, which hold all of the parts of the transverse beam together, pass through these holes. The two halves of the rectangular split block 18 and 20 may alternatively be made of aluminum, or GRP, or composite, for example.

Figure 9:
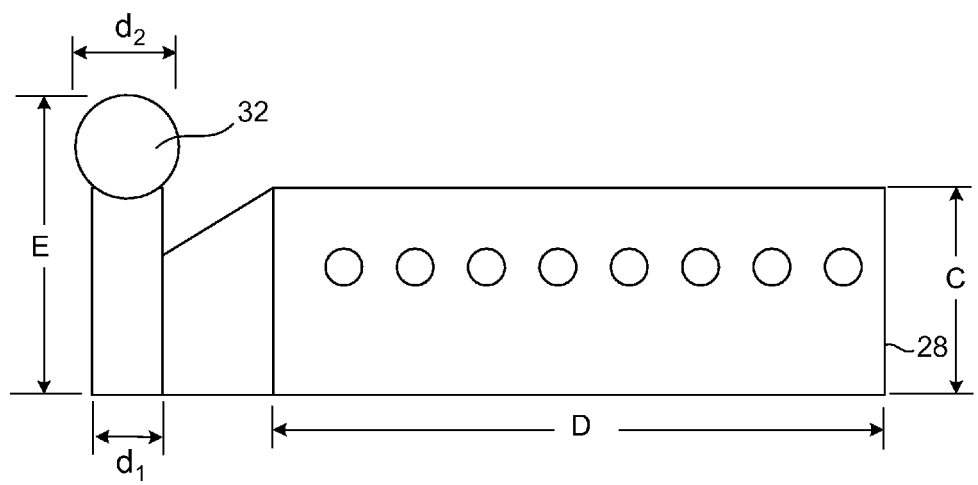
FIG. 9 is a front elevation of a portion of the seat support.
Figure 10:
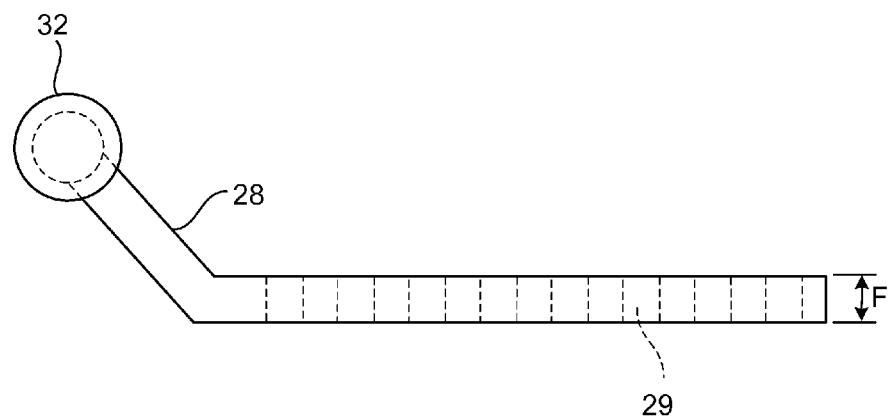
FIG. 10 is a plan view of a portion of the seat support.

The transverse beam has a left side and a right side 26 and 28 that comprise two identical flat pieces as shown with dimensions in FIGS. 9 and 10. In some implementations, the main flat section is, for example, 5/16" thick, 1½" high (C), and 4⅜" long (D). The adjoined section, which is bent toward the plan view transverse beam centerline 17, is, for example, 5/16" thick (F), 1⅜" long, and reduces in height from 1½" at the end joined to the main flat section to 1" height at the end which connects to a ½" diameter (D1) vertical post with a ¾" diameter (D2) spherical finial on top with a total height of 2⅛" € . The two sides of the transverse beam 26 and 28 bolted together on either side of assembled rectangular split block halves 18 and 20 form the transverse beam which supports and connects the divided seat sections. Two rows of evenly spaced ¼" diameter holes 29 arranged respectively along the two sides of the transverse beam 26 and 28 are bored to align with the two holes in the assembled halves of the rectangular split block 18 and 20, such that pairs of holes in the two sides of the transverse beam 26 and 28 can be selected and aligned symmetrically on either side of the assembled halves of the rectangular split block 18 and 20, such that the centers of the seat sections 38 and 40 at the ends of the transverse beam are as far apart as the bones of the buttocks, (ischeal tubularities), of the particular rider.

All of the figures showing the seat assembled show the left side of the transverse beam 26 bolted on in its shortest position and the right side of the transverse beam 28 bolted on in its longest position. In typical use, the two parts would be bolted on symmetrically, so the center of the central joint ball 16 and the longitudinal center of the assembled transverse beam align. The ends of the two sides of the transverse beam 26 and 28 extending beyond the rectangular split block 19 bend toward the plan view longitudinal centerline of the transverse beam such that the centers of the seat sections and the center of the central joint ball 16 align in plan view. The vertical dimension of the two sides of the transverse beam 26 and 28 is reduced as they approach their connections to two ½" diameter ($D_1$) transverse beam end posts 30 and 32, to allow clearance for the seat sections to gyrate freely.

The left side and right side transverse beam end post 30 and 32 are ½" diameter posts that have corresponding ¾" diameter ($D_2$) spherical finials on top, as shown in FIGS. 9 and 10, for example. These finials act as the balls for ball and socket joints which connect the respective two seat parts to opposite ends of the transverse beam. The left side and right side transverse beam end posts and balls 30 and 32 may be cast integrally with left and right sides of the transverse beam 26 and 28, if made of aluminum or GRP or composite, for example.

Figure 16:
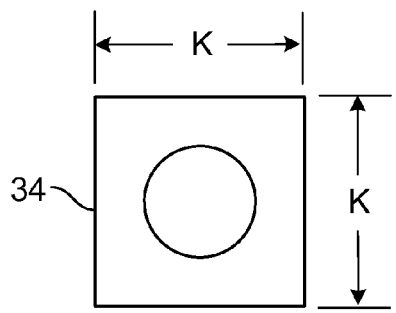
FIG. 16 is a plan of a portion of the seat support.
Figure 17:
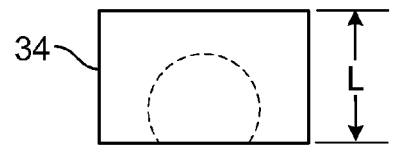
FIG. 17 is an elevation of a portion of the seat support.

Left side and right side seat mount sockets 34 and 36 are hollowed nylon blocks, as shown in FIGS. 16 and 17, which act as the sockets which fit on the finials of the transverse beam end posts and balls 30 and 32. Hollowed blocks 34 and 36 are square in plan view and measure 1½" by 1½" (K), for example. In side elevation they measure 1" high (L), for example. The hollowed blocks may pop on or they may be split and assembled around the balls using fastenings or adhesives. They may be made of aluminum, or GRP, or composite, or cast as integral parts of the seat parts 38 and 40. When mounted on the transverse beam end posts and balls 30 and 32 the hollowed blocks are free to tilt at least about 15 degrees, for example, in any direction from a level position, but the hollow blocks serve as stops to prevent tilting of the two seat parts farther than that permitted amount of tilting.

Figure 14:
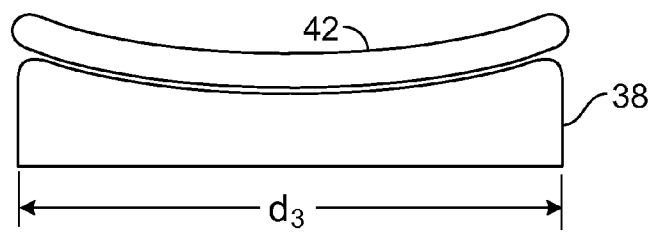
FIG. 14 is an elevation of a portion of the seat support.
Figure 15:
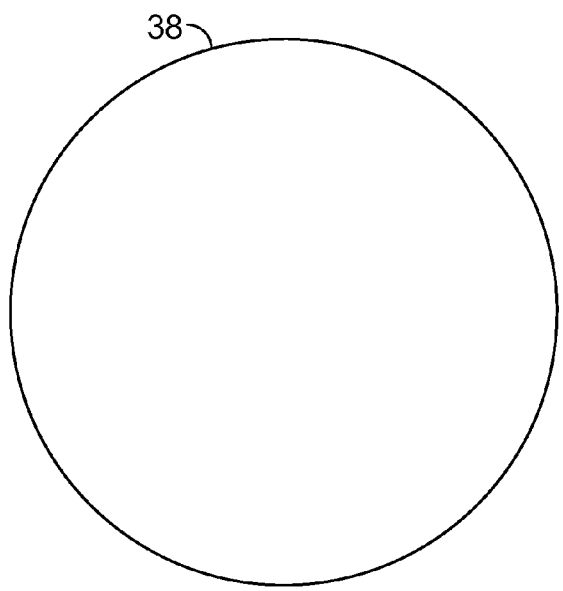
FIG. 15 is a plan of a portion of the seat support.

The two seat parts 38 and 40, shown in FIGS. 14 and 15, for example, are two 4" diameter disks, slightly concave in both horizontal dimensions on top, and are covered by left side and right side seat upholstery 42 and 44. The upholstery may be cotton batting covered with canvas, or foam covered with plastic, or sheepskin, fuzzy side up, for example. The left side and right side seat mount sockets 34 and 36 are fastened concentrically to the bottom sides of the seat parts 38 and 40 with fastenings or adhesives, or may be cast together with the seat parts 38 and 40 as single units. The seat parts 38 and 40 are made of aluminum, or GRP, or composite, or other plastic, for example.

Figure 5:
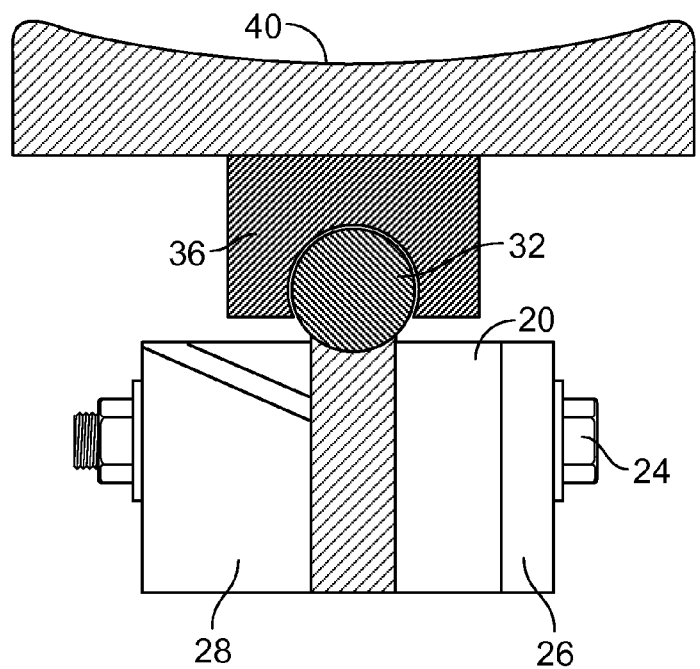
FIG. 5 is a vertical section 90 degrees across the centerline of the transverse beam through the seat mount bearings.

FIGS. 5 and 41 both show a vertical section 90 degrees across the transverse beam through the seat mounts, showing how the left and right sides of the transverse beam 26 and 28 are cut away 60, 62, (see also FIG. 1) at their outer ends to allow clearance for the seat parts and seat mount sockets to gyrate. FIG. 41 shows a side elevation of seat part 40 and seat mount socket 36 in a forward tilted position 64, and how transverse beam cutout 62 allows clearance in this position. FIG. 40 is a front elevation of the right end of the bicycle seat, the left end being identical, showing the seat structure tilted toward the transverse beam part 28, and showing how seat mount 36 does not contact the transverse beam in this tilted position because of cut out 62. FIGS. 40 and 41 show the seat mount socket passing as close as it ever comes to the transverse beam in the seat's three-dimensional gyrating path, thus showing that these parts never come in contact.

FIG. 2 shows a horizontal section through the transverse beam assembly with its ball and socket joint, ball 16, rectangular split block 19, bolts 22 and 24, and through the balls 30 and 32 and sockets 34 and 36 joints of the seat mounts, and shows in outline separated seat parts 38 and 40 above the transverse beam assembly. FIG. 2 shows how the elements of the transverse beam are bolted together, and how pairs of holes can be selected from the rows of holes in the left side and right side transverse beams 26 and 28 to align with the two holes in assembled rectangular split block 19 to create a transverse beam of desired length.

Figure 6:
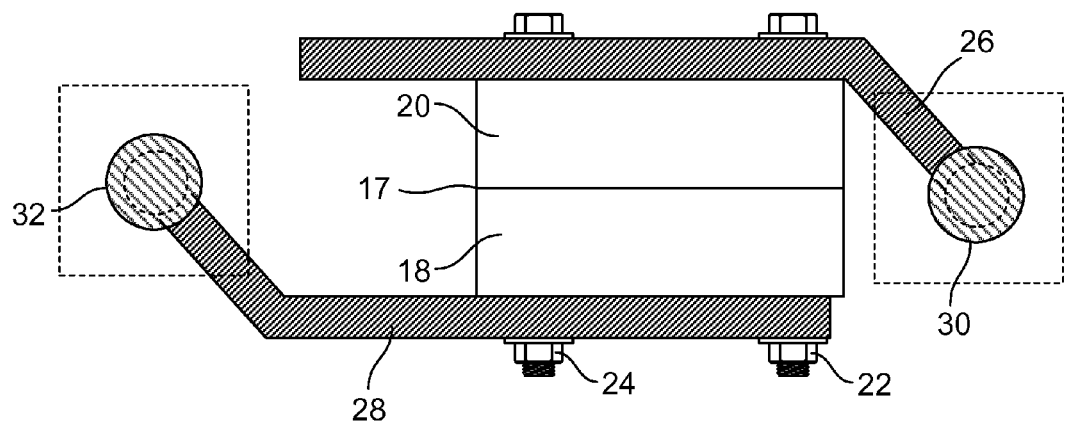
FIG. 6 is a horizontal section through the upper part of the transverse beam.
Figure 7:
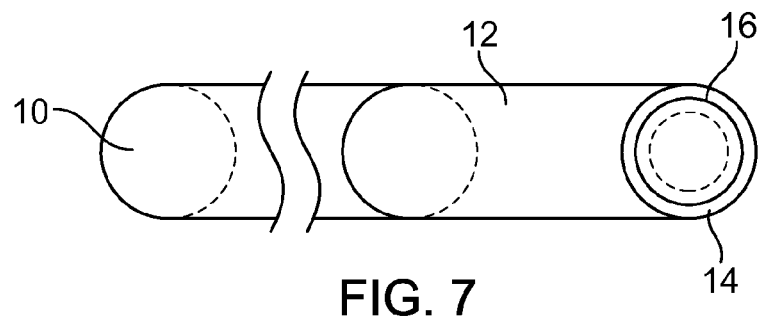
FIG. 7 is a plan view of a portion of the seat support.

FIG. 6 shows a horizontal section through the transverse beam near its top. This shows how the forward and aft halves of the central socket 18 and 20 are split on their longitudinal vertical centerline and how the bends in the left side and right side of the transverse beam 26 and 28 make the centers of the left side and right side transverse beam end posts and balls 30 and 32 align with the plan view centerline 17 of the transverse beam.

When a human is running, the femur sockets at the right and left ends of the pelvic bone gyrate in a way that causes the pelvic bone's horizontal axis to outline a horizontally oriented point to point double vortex with the adjoined points coming together at the base of the spine. The femur sockets themselves outline forward rolling circles which are the bases of the cone shaped vortices. This pelvic action drives the femurs in a reciprocating motion reminiscent of the reverse of the action of the steam pistons of an old fashioned locomotive driving its driving wheels, with the additional complexity that the knee ends of the femurs aren't fixed, as are the ends of steam pistons, but are themselves moving in their own forward rolling circles.

The structure we have described supports part of the weight of the rider's body while it permits the unrestrained natural running action of the pelvis. This three-dimensional articulation is illustrated as deconstructed into three two-dimensional views in FIGS. 18, 19, and 20.

Figure 18:
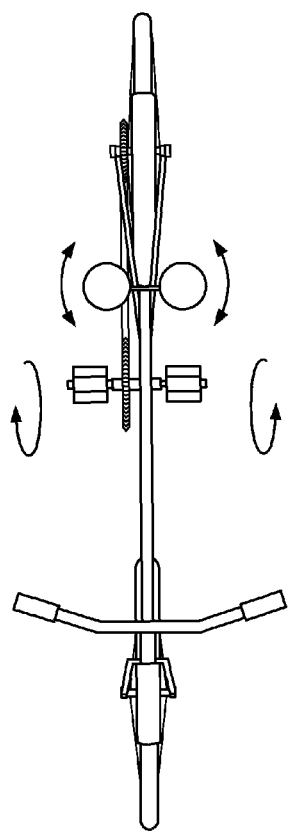
FIG. 18 is a plan view of a bicycle with the seat installed.

The double vortex gyration of the structure, in sympathy with the pelvis, when seen in two dimensions from above in plan view in FIG. 18 appears, as shown by double ended arrows, as a reciprocating, (right side forward, left side aft, then left side forward right side aft) partial rotation around the center point of the transverse beam, which point corresponds to the pivot point of the pelvis at the base of the spine. The right and left rotational arrows indicate the resulting turning of the pedals.

Figure 19:
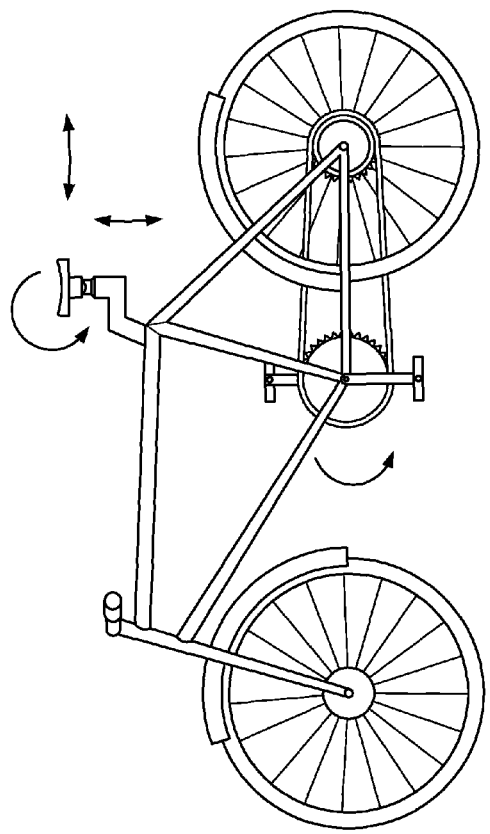
FIG. 19 is a side elevation of a bicycle with the seat installed.

The structure in side elevation view, FIG. 19, shows a horizontal fore and aft double headed arrow indicating the same reciprocating action as the arrows in FIG. 18, with the addition of a vertical double headed arrow indicating the simultaneous rocking side to side of the transverse beam, right side higher, left side lower, then left side higher, right side lower. In combination, these motions allow for the forward rolling circular motion common to the human femur sockets of the pelvis and the right and left ends of the transverse beam, as indicated by the rotational arrow. Again, the lower rotational arrow indicates the turning of the pedals.

Figure 20:
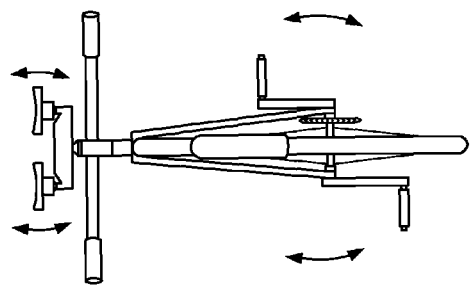
FIG. 20 is a rear elevation of a bicycle with the seat installed.

The structure in rear elevation view, FIG. 20, shows vertical double headed arrows indicating the side to side rocking of the transverse beam. In this two-dimensional view the pedals also appear, as indicated by double headed arrows, to be moving in an up and down reciprocating action. However when the information illustrated in all three two-dimensional views is combined, the correct idea of the pedals moving in forward rolling circles 180 degrees out of phase with each other emerges, as does the correct idea of the seat structure's transverse beam gyrating around a central pivot with its ends moving in forward rolling circles 180 degrees out of phase with each other.

Figures 21, 22, 23:
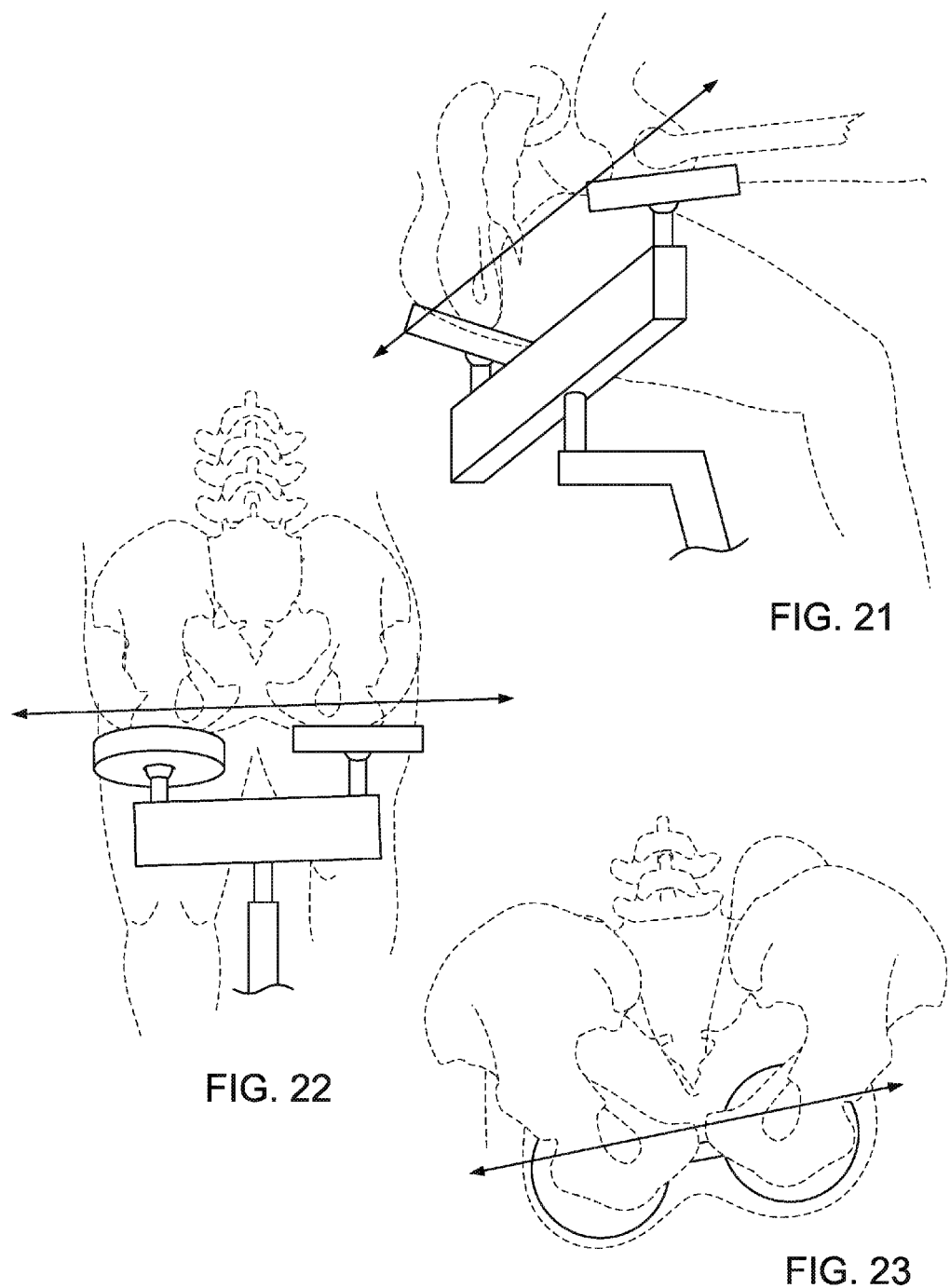
FIG. 21 is a side elevation of a pelvic bone and buttock seated on the seat as it would appear with the near pedal at 2 o'clock position.
FIG. 22 is a rear elevation of a pelvic bone and buttocks seated on the seat as it would appear with the right side pedal at 2 o'clock position.
FIG. 23 is a plan view of a pelvic bone seated on the seat as it would appear with the right side pedal at 2 o'clock position. Arrows drawn through the femur sockets of the pelvic bones show how these axes gyrate in sympathy with and remain parallel to the transverse beam of the seat.

In FIGS. 21, 22, and 23, three-dimensional information is again deconstructed into three two-dimensional views. Each view shows a double headed arrow passing through the base of the spine and the left and right ischeal tubularities and the left and right femur sockets of the pelvic bone. These arrows represent what is called above the horizontal axis of the pelvis. As shown, this axis is parallel to the transverse beam of the seat structure, and maintains this parallel relationship throughout the pedaling cycle. Through the pedaling cycle, the lower surface of the buttocks, the skin and muscle covering the rider's ischeal tubularities, which is the surface bearing the rider's weight, is continuously changing its tilt from nearly level to a forward cant and back again as the pelvis gyrates. The buttock supporting seat parts of this structure, whose mounts allow them to tilt in any direction and rotate independently from the transverse beam on whose ends they are mounted, maintain constant contact with the lower surfaces of the buttocks and tilt and rotate relative to the transverse beam exactly in sympathy with the buttocks throughout the pedaling cycle, and thus do not rub against them. Therefore no friction is created between the rider's skin and this structure.

As illustrated in FIGS. 21, 22, and 23, during a pedaling cycle, the structure that we have described permits free motion of the body in an unrestrained way much like the motion of the body during running. During the pedaling cycle, the ischial tubularities of the pelvic bone need to move independently of one another. For example, their vertical positions relative to one another changing continually from the left side of the pelvic bone being higher than the right side, the two sides being at the same elevation, to the right side being higher than the left side, and back through the same elevation, returning to the left side being higher than the right. During the pedaling cycle, there is cyclical fore and aft motion of the two sides of the pelvis. The motion varies from the left side of the pelvis being forward of the right side through the left side and right side being at the same positions fore and aft through the right side being forward of the left side and back through being in the same positions fore and aft and then with the left side forward of the right side again. Also, during each pedaling cycle, the canting of each of the femurs, and therefore the skin of the buttocks and the bottoms of the thighs vary cyclically. For each leg, the angle of the femur varies from being approximately horizontal to being canted down in the front relative to the back of the femur and then returning to the approximately horizontal position. These three cyclical motions—the left and right sides of the pelvis moving up and down relative to one another, the left and right sides of the pelvis moving fore and aft relative to one another, and each of the femurs canting up and down itself and in an opposite sense from the canting up and down of the other femur—all occur simultaneously through the pedaling cycle, making for a complex gyrating motion. The mountings of the seat parts on the transverse beam and of the transverse beam on the seat post of the bicycle and the freely permitted motion of them assures that the pelvic and femur cyclical motions are accommodated freely, without resistance, and without friction between the seat parts and the buttocks and thighs.

This complex motion is also illustrated in FIG. 24. When the pedal is at two o'clock (the first line of cells in FIG. 24) the right pelvis (we sometimes use the word pelvis interchangeably with the word buttocks; what were referred to as the pelvises are also sometimes referred to as ischial tubularities of the pelvis; sometimes, when we refer to buttocks, we are also referring to the muscle and skin that covers the ischial tubularities) is forward of the left pelvis, the right pelvis is higher than the left pelvis, the right femur is approximately horizontal, and the left is canted downward. When the pedal is at five o'clock, the right pelvis is slightly forward of the left pelvis and is slightly lower than the left pelvis, and the right femur is canted down while the left femur is approximately horizontal. When the pedal is at eight o'clock, the left pelvis is forward of and higher than the right pelvis, and the right femur is canted down slightly and the left femur is canted up slightly. When the pedal is at 11 o'clock, the right femur is slightly behind and higher than the left femur, the left femur is canted down, and the right femur is approximately horizontal. One could describe this motion during the pedaling cycle as the left pelvis and the right pelvis following roughly circular gyrating paths around the point at which the center of the transverse beam is mounted on the ball. The two gyrating paths are in a 180° phase relationship to one another. The cants of the femurs are also oscillating in opposite phases, up and down.

A wide variety of other configurations of the parts in their assembly are also possible alternatively or in combination with the ones described above.

In some examples, as shown in FIGS. 25, 26, and 27, a cylindrical shaft 110, seen vertical in front elevation, leans toward the rear of the bicycle to the same degree as the bicycle's own seat post in side elevation, and has a diameter that fits into the seat post so that its height can be held in proper adjustment by the bicycle's own seat post clamp. The upper end of the shaft connects to a horizontal beam 112, which cantilevers toward the rear of the bicycle and extends far enough to position the rider a comfortable distance from the handlebars. The cantilevered beam connects to the upper end of the shaft and cantilevers toward the rear of the bicycle 3" ($Q_1$), for example, from the centerline of the shaft to the center of the opening 115 of the block 114. The beam may be made of the same material as the shaft and rigid, or it may be made of a material which is stiff enough to adequately support the rider while springy enough to provide a shock absorbing suspension.

The rear end of the beam supports and is fastened to a block 114, as shown in FIGS. 28, 29, and 30, which is taller than long and longer than wide, and which is perforated transversely by an opening 115 which is taller than wide and whose edges are rounded in both side elevation and plan view, such that it accommodates a transverse beam that includes two sides 116 and 118, as shown in FIGS. 25, 26, and 27, in a way that allows the beam to gyrate in the opening to a degree which allows the rider all desired mobility, but doesn't allow the beam to tip toward the front or rear of the bicycle. Block 114 measures 2½" high (M), 1⅝" long (N), and ⅝" wide (O), and is perforated by opening 115 which measures 1⅞" high (P) by ⅝" wide (Q), for example. The transverse beam 116 and 118, as shown in FIGS. 34 and 35, is made of two flat pieces which, when bolted together, fit through the hole in the perforated block 114, with enough clearance to allow the beam to gyrate with slightly more than the maximum gyration required by the rider's pelvis in pedaling. The two identical flat transverse beam parts 116 and 118 measure ¼" thick (R) by 5½" long (S), for example. At the ends which are attached to end post and ball elements 120 and 122, parts 116 and 118 measure 1" high (T), which increases to 1½" high (H) at a point ½" from the end. This height measurement extends 3¼" toward the far end, at which point it again decreases to 1" height for the rest of its length, for example. The beam is held from sliding through the hole by cheek pieces 124, 126, 128, and 130, as shown in FIGS. 31, 32, and 33, bolted to both sides by the same bolts which hold the beam elements together. The cheek pieces are rounded at their ends 125, 127, 129, 131 closest to the opening in both front and rear elevation views so that they don't interfere with the gyration action of the beam. Parts 124, 126, 128, 130 measure ¼" thick ($Y_1$), 1¼" high ($Y_2$), and 1½" long ($Y_3$). Their ends, 125, 127, 129, 131, are shaped in elevation as ¾" radius half circles ($Z_1$) and in plan as ¼" radius ($Z_2$) quarter circles. The beam elements terminate at their outside ends in posts 120 and 122, similar to those described in the early arc examples, but which require less offset to align them from end to end.

The transverse beam sides 116 and 118, are perforated with respective lines of holes, similar to those described earlier, which are used in the same way to adjust the length of the beam.

In some implementations, the rear end of the cantilevered beam supports and is fastened to a short cylinder 216, which measures 1½" diameter ($W_1$) and ½" high ($W_2$), for example, as shown in FIGS. 37 and 38, perforated by a hole 217 at its center and by a circle of shallow holes 219 around its circumference in which flexible solid rubber cylinders 218, are inserted, and whose upper ends are fitted in matching shallow holes 219 in a matching short cylinder 220, with a similar central perforation 221, placed on them upside down. The upper short cylinder supports and is fastened to a block 224, which is wider side to side than tall and taller than it is thick from front to back. Block 224 measures 2½" long ($X_1$), ½" thick ($X_2$), and 1½" high ($X_3$), for example. The block is perforated by a ¼" diameter hole 225 which aligns with the central holes 223 in the two matching short cylinders 216 and 220. The same hole continues in line through to the bottom of the cantilevered beam or spring. A Dacron cord 222, or other flexible line of a non-stretching material passes through all of these aligned holes and is pulled tight and held tight by knots 227 or other line stopping devices at its ends, so that the rubber cylinders are held in compression. The rubber cylinders are of a length to allow clearance between the short cylinders so that the block at the top can gyrate relative to the cantilevered beam. Flat transverse beam elements 228 and 230, are bolted to the top block in a way similar to those described earlier.

In some examples, the short cylinders of the third embodiment contain between them a coiled spring 310, as shown in FIG. 36, which is attached to each of them, similarly allowing the attached upper block to gyrate relative to the cantilevered beam, but obviating the need for a central tension cord.

The ends of the transverse beams in various implementations may have ball and socket joints to connect them to the seat sections, as in the first examples that we described, or they may be attached to the seat sections with devices similar to the central transverse beam to cantilevered beam joining devices of the later examples, allowing the seat sections to gyrate relative to the ends of the transverse beams.

Although the examples discussed above are of seats for bicycles, similar seats can be mounted in similar ways on any of a wide variety of other devices on which people sit. Such devices can include cycling devices in which the buttocks and legs move cyclically in a motion that is similar to or akin to the motion that occurs during running. Such cycling devices can include bicycles, unicycles, tricycles, and human powered aircraft, to name a few. The cycling devices can include devices designed to move the entire user from one place to another, and devices in which the user remains in the same place while the cyclical motion is occurring, such as a wide variety of exercise devices. Furthermore, devices that have seats and in which the user's buttocks and legs are moving continually or only from time to time and are not necessarily moving cyclically can benefit from the concepts that we have discussed, for example, seats in trucks or boats or other vehicles, office and work chairs, and other kinds of chairs. Other implementations are also within the scope of the following claims.

The invention claimed is:

1. A structure to support the two buttocks of a user while the user is pedaling a device to which the structure is attached, the structure comprising
   a first buttock support and a second buttock support, the first buttock support and the second buttock support each having a surface against which the bottom surface of a corresponding buttock of the user bears during the pedaling, and
   a mechanism that connects the first buttock support and the second buttock support to a frame of the device to independently and simultaneously permit free angular motion of the first buttock support about a first horizontal axis that is perpendicular to a direction in which the user faces while pedaling and about a second horizontal axis that is aligned with the direction in which the user faces while pedaling and permit free angular motion of the second buttock support about the first horizontal axis and about a third horizontal axis that is aligned with the direction in which the user faces,
   the mechanism configured to return each of the first buttock support and the second buttock support, respectively, to a neutral orientation when the first buttock support and the second buttock support are not being pushed by the user.

2. The structure of claim 1 comprising a seat to be attached to the device.

3. The structure of claim 1 in which the device comprises a vehicle.

4. The structure of claim 1 in which the mechanism comprises an adjustment to alter a distance between the two buttock supports along the first horizontal axis.

5. The structure of claim 1 comprising a connector to attach the structure to an existing seat mount of the device.

6. The structure of claim 5 configured so that the two buttock supports will support the user's buttocks at a distance from handlebars of the device along the second axis that is similar to a distance from the handlebars at which the buttocks would be supported by an existing seat of the device.

7. The structure of claim 1 in which the surfaces of the buttock supports are concave.

8. The structure of claim 1 in which the surfaces of the buttock supports are no larger than necessary to provide comfortable support to the surfaces of the user's buttocks.

9. The structure of claim 1 comprising a transverse base coupled to the buttock supports so that each of the buttock supports can move relative to the transverse base and the buttock supports can move relative to one another.

10. The structure of claim 9 in which the transverse base is rigid.

11. The structure of claim 9 in which the transverse base is coupled to the frame by a joint that allows the transverse base to rotate horizontally and rock from side to side.

12. The structure of claim 11 in which the joint comprises a shaft that is canted toward the rear of the device in side elevation to the same degree as the device's seat post.

13. The structure of claim 9 comprising two joints coupling the respective buttock supports to the transverse base to permit the angular orientations of the buttock supports to vary within ranges that are at least slightly more than the ranges of angular motion of the buttocks of the user during the pedaling.

14. The structure of claim 1 in which the device comprises a bicycle.

15. The structure of claim 1 also comprising the device.

16. The structure of claim 1 in which the neutral orientation comprises a level orientation.

17. The structure of claim 1 in which the tension structure comprises a first tension element that operates on the first buttock support and a second tension element that operates separately on the second buttock support.

18. The structure of claim 1 in which the tension structure includes a first tension element to return at least one of the buttock supports from an angular orientation about the first horizontal axis and a second tension element to return the first buttock support from an angular orientation about the second horizontal axis.

19. The structure of claim 1 in which the tension structure is to apply a minimum tension needed to return the first buttock support and the second buttock support, respectively, to the neutral position when the first buttock support and the second buttock support are not being pushed by the user, and the minimum tension is based on a weight of the first buttock support and the second buttock support, respectively.

20. The structure of claim 1 in which the tension structure includes a bungee cord.

21. The structure of claim 1 in which the tension structure includes a flat leaf spring.

22. The structure of claim 1 in which the tension structure includes a coil spring.

23. A structure to support the two buttocks of a user while the user is pedaling a device to which the structure is attached, the structure comprising
   a first buttock support and a second buttock support, the first buttock support and the second buttock support each having a surface against which the bottom surface of the respective buttock bears during the pedaling, and
   a mechanism that connects the first buttock support and the second buttock support to a frame of the device to independently and simultaneously permit free angular motion of each of the first and second buttock supports, the mechanism including a transverse beam coupled to the first buttock support and the second buttock support, the transverse beam to rotate about a point at which the transverse beam is supported on the device, to proportionately and simultaneously displace the first buttock support and the second buttock support in opposing directions.

* * * * *